Oct. 9, 1962     K. E. A. GÖTHBERG     3,057,628
SEALING DEVICE
Filed Nov. 18, 1958
FIG. I.
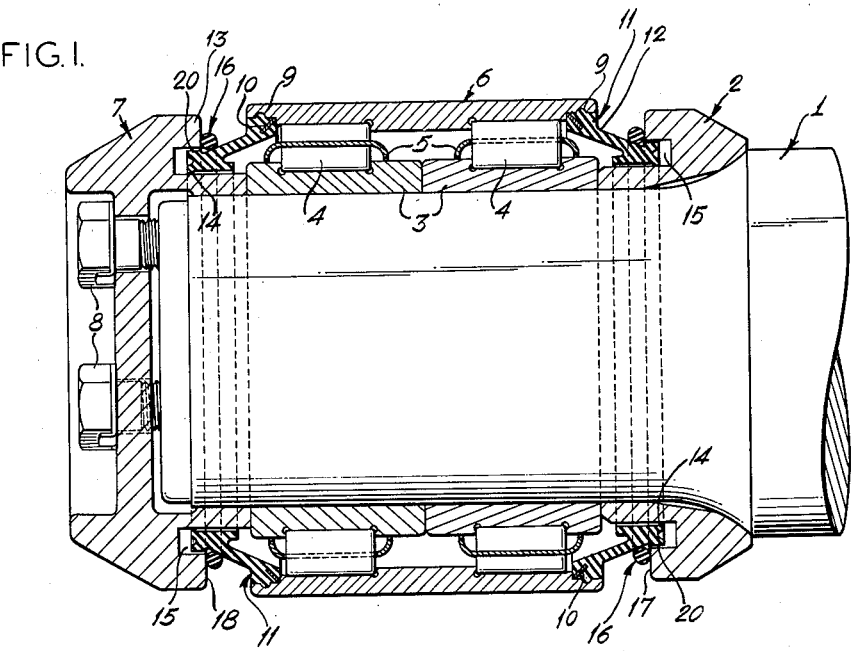
FIG. 2.
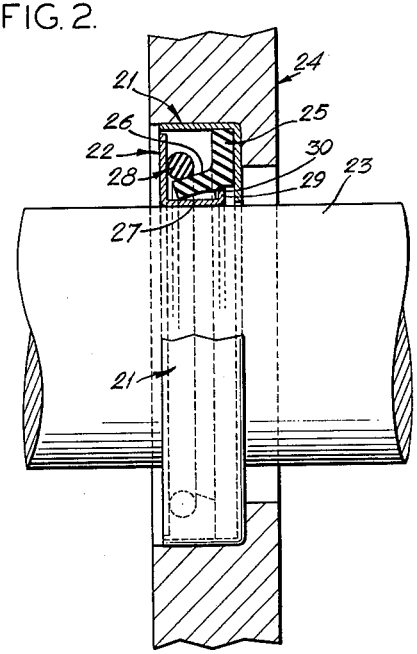
INVENTOR:
KARL EVALD ANDREAS GÖTHBERG
BY Howson & Howson
ATTYS.

United States Patent Office 3,057,628
Patented Oct. 9, 1962

3,057,628
SEALING DEVICE
Karl Evald Andreas Göthberg, Bacasen, Lerum, Sweden, assignor to Aktiebolaget Svenska Kullagerfabriken, Goteborg, Sweden, a corporation of Sweden
Filed Nov. 18, 1958, Ser. No. 774,753
Claims priority, application Sweden Nov. 27, 1957
6 Claims. (Cl. 277—39)

The present invention relates to a device for sealing the interstice between co-axial surfaces on a pair of relatively rotatable members where the requirements for effective sealing are great, for example to protect the bearings of machines working in very dusty or damp atmosphere, in agricultural machines and in vehicles of various kinds, such as motor cars and railway carriages or goods wagons.

The present invention relates to a sealing device for two co-axial surfaces on relatively rotatable members, and is characterized mainly in that it comprises a collar for example of rubber, connected directly or indirectly to one of said members and having a lip and a conical surface concentric with the axis of rotation, there being an O-ring mounted on the said conical surface under tension, and disposed so as to increase the pressure of the said lip against the other of said members and to seal slidingly against a surface transverse to the axis of rotation and associated with the said other member.

Two forms of the invention are described below, and are illustrated on the accompanying drawings, in which FIG. 1 is a sectional view showing a seal applied to an axle box for a railway vehicle, and FIG. 2 is a fragmentary sectional view showing a separate sealing unit mounted on a shaft.

In FIG. 1, the numeral 1 designates the axle for a pair of wheels (not shown) in a railway vehicle. On the axle are mounted a collar 2 and the inner race rings 3 of a pair of roller bearings having rollers 4 and cages 5. The rollers roll in an outer race ring 6 common to both rows. A journal cover 7 is connected to the axle by means of three screws 8, and retains the inner race rings 3 in place on the journal. At each end of the outer race ring 6 is a groove 9 which forms a seat for a sealing member 11 comprising a generally conical sleeve 12, preferably of rubber, which is provided with a lip 14. The cover is provided with a flange 13 which protects the lip, which latter is so shaped that it forms, together with the cover and the flange, a labyrinth 15. The large end of the rubber sleeve is reinforced by a ring 10 of sheet metal. On the outer conical surface of the sleeve 12, which is provided at its smaller end with a shoulder 20, an O-ring 16 is mounted under tension and slidingly engages with a radial surface 17 or 18 on the collar 2 or cover 7, respectively. The O-ring serves a double purpose in the seal: Firstly, because it is mounted under tension, it exerts a pressure on the lip 14 to press it against the cylindrical portion of the cover 7 embracing the end of the shaft 1, through the collar 2 and cover 7 in the present instance, and secondly, it serves in itself as a seal against the surfaces 17 and 18 respectively.

The present invention may be carried out in various embodiments. FIG. 2 shows an example of a separately mountable sealing unit comprising mainly a pair of sheet metal rings 21 and 22, of which the ring 22 is mounted on the shaft 23, and the ring 21 in a wall 24 intersected by the shaft. The sheet metal rings are formed so that they form an annular closed space, more or less square, in cross section. Each sheet metal member comprises a cylindrical and a radial portion. A rubber collar 25 is vulcanized to the inner surface of the radial portion of member 21. This collar is provided with a lip 27 having an external conical surface 26, the lip 27 slidably engaging the confronting surface of the cylindrical portion of member 22. An expanded O-ring 28 is mounted under tension on the conical surface of the collar 25 and presses the lip 27 against the said surface of member 22, or in effect against the shaft 23 and also seals against the surface of the radial portion of the member 22. The cylindrical portion of the member 22 is provided with a turned-out flange 29 which cooperates with a shoulder 30 on the rubber collar to hold the elements of the unit together before it is mounted.

I claim:
1. A sealing device for sealing the interstice between co-axial surfaces on a pair of relatively rotatable members comprising at least one flexible collar connected to one of said members and having a flexible lip projecting toward the other member for sealing contact with said other member, a conical surface on said lip concentric with the axis of rotation, an abutment surface on said other member extending transversely of the axis of rotation and confronting said conical surface, and an O-ring mounted under radial tension on said conical surface whereby said O-ring presses said lip against said other member, said radial tension cooperating with said conical surface to urge said O-ring in sealing engagement with said abutment surface whereby a dual seal is provided between said members.

2. A sealing device according to claim 1 including means on the second member forming a labyrinth seal with said lip.

3. A sealing device according to claim 1 including a flange on the said other member extending over the lip to protect the latter from injury.

4. A sealing device according to claim 1 wherein the said other member comprises means for retaining the collar axially to form a mechanically interlocked unit whereby said abutment surface is retained against axial displacement relative to said conical surface.

5. A sealing device according to claim 1, wherein said abutment surface comprises a shoulder which retains the O-ring in operative position on the conical surface.

6. A sealing device for sealing the interstices between co-axial surfaces on a pair of relatively rotatable members, said device consisting of a pair of annular elements adapted for attachment respectively to said members and each having a radial wall, the said walls being in co-axial, relatively spaced relation, a transverse, circumferential flange on one of said walls extending toward the other wall, a collar attached to the face of the latter wall and having a flexible circumferential flange extending into sealing engagement with the proximate face of the transverse wall flange, the outer face of the flexible flange being conical, a resilient O-ring embracing the flexible flange and resiliently pressing the flexible flange against the face of the wall flange, said ring having seating against the radial wall of the flanged element and being retained by said wall in operative position on the said flexible collar flange, and means on the wall flange interlocking with the collar to retain the annular elements together for handling with the collar as a unit.

References Cited in the file of this patent
UNITED STATES PATENTS

| | | |
|---|---|---|
| 2,240,252 | Bernstein | Apr. 29, 1941 |
| 2,698,194 | Becker | Dec. 28, 1954 |
| 2,830,832 | Moorman et al. | Apr. 15, 1958 |
| 2,866,670 | Harris et al. | Dec. 30, 1958 |
| 2,871,039 | Payne | Jan. 27, 1959 |
| 2,879,114 | Bowen | Mar. 24, 1959 |